(12) United States Patent
Koch et al.

(10) Patent No.: US 8,721,299 B2
(45) Date of Patent: May 13, 2014

(54) PISTON MEMBER, AN APPARATUS COMPRISING THE PISTON MEMBER, AND METHODS AND USE OF THE PISTON MEMBER AND THE APPARATUS

(75) Inventors: Thomas Koch, Soborg (DK); Peter Friehling, Tureby (DK)

(73) Assignee: Thermochem Recovery International, Inc., Baltimore, MD (US)

( * ) Notice: Subject to any disclaimer, the term of this patent is extended or adjusted under 35 U.S.C. 154(b) by 0 days.

(21) Appl. No.: 13/501,719

(22) PCT Filed: Oct. 13, 2010

(86) PCT No.: PCT/DK2010/050267
§ 371 (c)(1),
(2), (4) Date: Apr. 12, 2012

(87) PCT Pub. No.: WO2011/044911
PCT Pub. Date: Apr. 21, 2011

(65) Prior Publication Data
US 2012/0213647 A1 Aug. 23, 2012

(30) Foreign Application Priority Data
Oct. 14, 2009 (DK) .................................. 2009 01123

(51) Int. Cl.
*F04B 25/00* (2006.01)
*F04B 3/00* (2006.01)
*F16J 15/18* (2006.01)

(52) U.S. Cl.
USPC .............................. 417/254; 417/244; 92/168

(58) Field of Classification Search
USPC ........ 417/254, 256, 489, 62, 244, 246; 92/48, 92/168
See application file for complete search history.

(56) References Cited

U.S. PATENT DOCUMENTS

| 2,861,519 | A | * | 11/1958 | Houle | 417/46 |
| 2,892,645 | A | * | 6/1959 | Tydeman | 277/589 |
| 2,903,281 | A | * | 9/1959 | Avery | 277/530 |
| 2,919,652 | A | * | 1/1960 | Fay | 417/254 |

(Continued)

FOREIGN PATENT DOCUMENTS

| CH | 560367 | 3/1975 |
| DE | 2608093 A1 | 9/1976 |

(Continued)

OTHER PUBLICATIONS

International Search Report and Written Opinion, PCT/DK2010/050267, mailed Nov. 23, 2011.

(Continued)

*Primary Examiner* — Charles Freay
*Assistant Examiner* — Alexander Comley
(74) *Attorney, Agent, or Firm* — Womble Carlyle

(57) ABSTRACT

A piston member that includes a piston rod provided with a piston serves for reciprocating inside a cylinder barrel, the piston dividing the cylinder barrel chamber into a proximal cylinder barrel chamber having a proximal capped end opposite the piston and a distal cylinder barrel chamber having a distal cylinder barrel end opposite the piston. The piston member has at least one sealing ring or seat arranged inside the distal cylinder barrel chamber at the distal cylinder barrel end. Preferably three consecutive piston members are arranged to operate in a series in an apparatus for transporting coal powder to a gasifier. The movement of the pistons inside the cylinder barrels is controlled in relation to each other to transport apportioned batches of coal powder to a high pressure reactor.

35 Claims, 6 Drawing Sheets

(56) References Cited

U.S. PATENT DOCUMENTS

| | | | | |
|---|---|---|---|---|
| 3,153,385 | A | * | 10/1964 | Bowen, Jr. .................... 417/490 |
| 3,163,431 | A | * | 12/1964 | Tanner .......................... 277/381 |
| 3,264,005 | A | * | 8/1966 | Bialkowski ................... 277/529 |
| 4,029,442 | A | * | 6/1977 | Schlosser ..................... 417/489 |
| 4,047,854 | A | * | 9/1977 | Penn ............................. 417/489 |
| 4,221,550 | A | * | 9/1980 | Pleass ........................... 417/437 |
| 4,369,633 | A | * | 1/1983 | Snyder ........................... 62/117 |
| 4,637,295 | A | * | 1/1987 | Powers et al. ................ 92/170.1 |
| 5,144,882 | A | * | 9/1992 | Weissgerber ..................... 92/87 |
| 5,374,148 | A | * | 12/1994 | Kilpelainen et al. .......... 414/217 |
| 5,466,108 | A | * | 11/1995 | Piroska ......................... 414/218 |
| 5,876,189 | A | * | 3/1999 | Lukas et al. .................. 417/392 |
| 6,168,398 | B1 | * | 1/2001 | Handtmann ................... 417/510 |
| 6,558,135 | B1 | * | 5/2003 | Wood ........................... 417/254 |
| 2005/0081766 | A1 | * | 4/2005 | McIntosh ...................... 110/286 |
| 2008/0118373 | A1 | * | 5/2008 | Richey et al. ................. 417/254 |
| 2009/0130003 | A1 | * | 5/2009 | Koch et al. .................... 422/232 |

FOREIGN PATENT DOCUMENTS

| | | |
|---|---|---|
| DE | 85 27 423 | 2/1991 |
| DE | 43 06 326 A1 | 10/1993 |
| EP | 1 425 089 B1 | 6/2004 |
| GB | 1127383 | 9/1968 |
| GB | 1159731 | 7/1969 |
| JP | 57-70423 | 4/1982 |
| JP | 11-64075 | 3/1999 |
| JP | H11 64075 A | 3/1999 |
| WO | WO 93/23709 A1 | 11/1993 |
| WO | WO 93/23709 A1 | 11/1993 |
| WO | WO 96/06673 A1 | 3/1996 |
| WO | WO 03/013714 A1 | 2/2003 |
| WO | WO 2009/063432 A2 | 5/2009 |
| WO | WO 2009/063432 A2 | 5/2009 |

OTHER PUBLICATIONS

Official Action with search report dated Jan. 13, 2014 issued in Chinese counterpart application (No. 201080046698.0).

Official Action with search report dated Jan. 13, 2014 issued in Chinese counterpart application (No. 201080046698.0)—English translation.

* cited by examiner

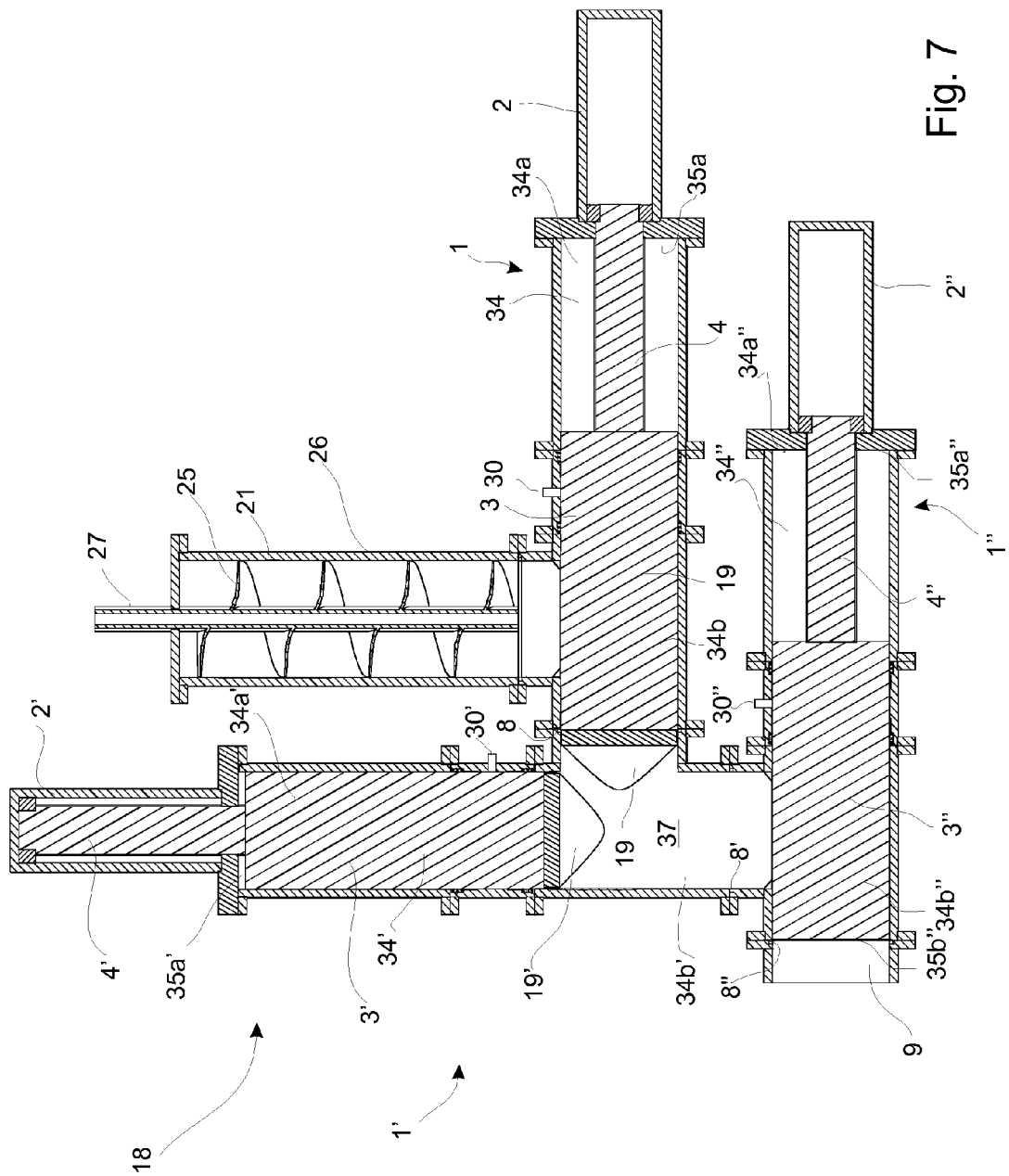

PISTON MEMBER, AN APPARATUS COMPRISING THE PISTON MEMBER, AND METHODS AND USE OF THE PISTON MEMBER AND THE APPARATUS

This application is a 371 filing of International Patent Application PCT/DK2010/050267 filed Oct. 13, 2010.

BACKGROUND

The present invention relates to a piston member comprising a piston rod provided with a piston reciprocating inside a cylinder barrel, said piston divides the cylinder barrel chamber into a proximal cylinder barrel chamber having a proximal capped end opposite the piston and a distal cylinder barrel chamber having a distal cylinder barrel end opposite the piston.

The invention further relates to an apparatus for continuous transporting apportioned batches of material to a recipient, such as a gasifier or reactor.

The invention further relates to methods of continuous transporting apportioned batches of material to a recipient, such as a gasifier or a reactor under high pressure.

In particular the present invention relates to the use of an apparatus and methods for transporting coal powder and other solid materials.

Gasification of fossil fuels, biomass or waste is currently widely used on industrial scales to generate electricity.

Gasification relies on chemical processes at elevated temperatures greater than 700° C., which puts a high demand on safety regulations when the raw material are continuously fed to the gasifier, in particular due to presence of toxic and explosive gases. In a gasifier, the carbonaceous raw material undergoes several different processes. First the pyrolysis process occurs as the carbonaceous particle heats up. Volatile gases are released and char is produced resulting in weight loss of coal. The process is dependent on the properties of the carbonaceous material and determines the structure and composition of the char, which will then undergo gasification reactions. Next the volatile products and some of the char reacts with oxygen to form carbon dioxide and carbon monoxide in a combustion process, which provides heat for the subsequent gasification reactions where the char reacts with carbon dioxide and steam to produce carbon monoxide and hydrogen. By introducing oxygen or air into a gasification system organic material is converted into carbon monoxide and energy, for driving a second reaction that converts further organic material to hydrogen and additional carbon dioxide.

The feeding of solids into a high pressure reactor has however always been difficult because of both high equipment costs and poor material characteristics. Lock hoppers, which are the most commonly used principle for feeding against a pressure, have serious problems in the very high consumption of inert gas used for pressurizing and transfer. This is especially the case for feeding solids with a low density or with a tendency to form bridges. One other major shortcoming of lock hoppers is that it is a batch type operation. Since the valves between hoppers must be operable with high concentration of solids while moved, the valves are subject to sticking and seal failure under the operating conditions. Both the depressurizing valve and the vent lines are subject to severe abrasive conditions as the result of the rapid movement of hard solids therethrough under the influence of the differential pressure. Such systems are thus subject to sequence control failures and unsuitable for continuous operation due to great costs.

EP 1 425 089 relates to a method and apparatus for transfer of particulate products between zones of different pressure. In a sluice system the particulate product is first transported through a portioning device, which produces a sequence of uniform product portions divided by uniform particle free spaces. Subsequently the product portions are transported individually through a sluice device, which comprises at least one sluice chamber and two pressure locks of which at least one at any time secures a pressure tight barrier between the two pressure zones, and the product portions are force loaded from the first zone into a sluice chamber by means of a piston screw, the axis of which is practically in line with the axis of the sluice chamber, and the product portions are force unloaded from the sluice chamber and into the second pressure zone by means of said piston screw or a piston or by means of gas, steam or liquid supplied at a pressure higher than that of the second pressure zone. The sealing surfaces of the apparatus described in EP 1 425 089 are very vulnerable to wear resulting in that the apparatus is prone to leak. If gas is used as the pressure fluid the gas that is compressed in the sluice chamber must be released as the sluice chamber has to be decompressed in order to be filled again. Thus the gas from the sluice chamber will be released to the atmosphere during each piston stroke. This means that either the apparatus can only feed into atmospheres that are not combustible, explosive or poisonous or the consumption of inert bleed gas, i.e. gas resulting from any leakage in the feeding mechanism, will be very high.

SUMMARY OF THE INVENTION

In a main aspect according to the present invention is provided a piston member, an apparatus and a method by means of which the disadvantageous of the prior are can be remedied.

In a second aspect according to the present invention is provided a piston member, an apparatus and a method by means of which materials can be transported into combustible, explosive and/or poisonous atmospheres without safety risks.

In a third aspect according to the present invention is provided a piston member and an apparatus with lower wearing-down frequency than hitherto known.

In a fourth aspect according to the present invention is provided an apparatus in which the apparatus components can be replaced at minimum costs and downtime.

In a fifth aspect according to the present invention is provided a piston member, an apparatus and a method by means of which fine particles of combustible material can be transported to a recipient, including a gasifier or a reactor, without clogging.

In a sixth aspect according to the present invention is provided an apparatus for continuous transporting apportioned batches of material to a hot recipient without bridging.

The novel and unique feature whereby at least one of the above aspects is achieved according to the present inventions consist in that at least one sealing ring or seat is arranged inside the distal cylinder barrel chamber at the distal cylinder barrel end, preferably a ductile sealing ring or a ductile seat.

Within the scope of the present invention a "ductile material" is defined as a material having the mechanical property of being deformed plastically without fracture.

The ductile sealing ring or ductile seat is hit by the piston in a forward piston stroke by means of a force resulting in that the ductile sealing ring or ductile seat is deformed to such an extent that a fluid tight seal is created between the contacting surfaces of the cylinder barrel chamber, the ductile sealing ring or seat, and the piston. The seat may be constituted by an annular protrusion on the interior cylinder barrel wall or may be constituted by a separately inserted sealing ring. In the first case the entire cylinder barrel part must be substituted, in the latter case only the sealing ring needs replacement. In both cases the seat or sealing ring constitutes an annular protruding end section of reduced diameter of the cylinder barrel chamber, which end section, at the end of the forward piston stroke, is hit by the piston transporting the material in front of the piston. The piston member is thus designed with a travel of piston that is longer than the axial length of the piston.

Due to the ductility of the material of the ductile sealing ring or ductile seat, said ductile sealing ring or ductile seat reassumes its original configuration during the return piston stroke. Thus, the ductile sealing ring or ductile seat serves as an advantageously moving seat for sealingly engaging the piston and the cylinder barrel. A preferred embodiment of a piston member that creates a sufficient deformation of the ductile sealing ring or ductile seat when hit by the piston includes a piston manufactured from a hard metal, e.g. hardened steel and a ductile sealing ring or ductile seat manufactured from a ductile metal, e.g. austenitic stainless steel.

Austenitic stainless steels have high ductility and high ultimate tensile strength resulting in a very reliable metal-metal seal between the components of the piston member and the ductile sealing ring or ductile seat, where the ductile sealing ring or ductile seat advantageously regenerates after each piston stroke. This embodiment is suitable for use for transporting solid combustible material to a high pressurized recipient.

In case the sealing ring or seat is manufactured of a metal that is not ductile, said sealing ring or seat may not be able to reassume its shape but the sealing capability is still present and reliable due to the intimate metal-metal seal between the components of the piston member and the sealing ring or seat. In this embodiment the sealing ring or seat may be cast together with the cylinder barrel.

Irrespective of the sealing ring or seat is manufactured of a ductile material or not, the sealing ring or seat can be replaced at low cost once wearing requires it to maintain reliable sealing, in contrast to conventional apparatuses where downtime during maintenance often is prolonged.

A further advantage of such a sealing ring or seat is that deposits, aggregated matter or any foreign matter can be broken or cut without detrimental consequences for the sealing property of the sealing component, i.e. the sealing ring or seat. The edge of the sealing ring or seat serves as a cutting knife for any transported material present in the cylinder barrel when hit by the piston, thus an inherent and advantageous further property of the sealing ring or seat is as a tool for preventing clogging and accumulation in the cylinder barrel.

Advantageously, the piston may have a front nose facing towards the distal cylinder barrel chamber to compensate for differences in volume of piston and a total volume of an intermediate compartment into which material is transported on its way to the recipient. Transport may take place continuously, in consecutive apportioned batches of a volume each corresponding substantially to the volume of the intermediate compartment, in order that the transport process maintains pressure neutral. Thus the nose is preferably designed so that the total volume of the intermediate compartment becomes as close to the volume of the piston when the nose protrudes inside said intermediate compartment. The difference between volumes arises due to coupling flanges that are required when two tubular members are coupled in fluid communication with each other and due to fabrication tolerances of the piston and feed chamber. By appropriate dimensioning the protruding nose with respect to size and shape control of the above volumetric ratio between volume of piston and intermediate compartment can be obtained. The nose can have any convenient design that does not influence the piston stroke or is not in the way for the reciprocating movement of the piston, hence advantageously the pistons are also prevented from rotating about the piston axis to further ensure clearance angle and clearance area for noses on pistons on several co-operating piston members.

In the preferred embodiment the nose has an axial cut-out or an axial concavity configured to provide space for another piston reciprocating perpendicular to the piston furnished with the nose.

An exemplary intermediate compartment is for example the temporary intermediate compartment established by consecutive reciprocation co-operating piston members arranged substantially perpendicular to each other, as will be described in more detail later. As an example of volumetric ratio, if the ratio between the volume of the intermediate compartment and the volume of the piston is 11:10 the piston member will have zero transport of gas at a backpressure of 10 bar. Since the solid material takes up some of the volume in the intermediate compartment also it is possible to obtain a neutral pressure of up to 100 bar reactor pressure.

Normally a sluice system of co-operating piston members that feed a pressurized reactor is not tight and induces a flow of gas with the result that either gaseous matter, such as carbon monoxide, leaks to the surroundings, or atmospheric air is introduced into the operating process of the sluice system. In conventional piston member applications a drop in the functionality of linear sealing is often detected after a period of operation. When the piston is in contact with solid materials that are very abrasive, such as biomass or coal powder, this period can be unacceptable short.

If a piston member suddenly stops operating in a fluid tight manner the piston member may have means for detecting leakage of pressurized gas or fluid from a reactor or through a cylinder barrel chamber in direct or indirect communication with the piston member.

An exemplary embodiment of the means for detecting leakage of pressurized gas or fluid may comprise a pressure measuring instrument in fluid communication with a pressurized chamber delimited by the circumferential clearance between the piston and the interior wall of the cylinder barrel and two spaced apart annular seal members arranged in or at the cylinder barrel chamber wall.

For use in the present application the term "pressurized chamber" is to be understood as a chamber having a pressure above the pressure of the surrounding environment.

Eventually the sealing ring or seat at the end of the piston barrel chamber, i.e. the sealing ring is located at the end of the piston stroke, becomes ineffective or defect during the many piston strokes, e.g. due to wear, or is damaged due to contact with harder components. At that time it is very important to immediately replace the sealing ring or the seat. Thus early detection of leakage is crucial for an effective, favorable and profitable operation of the piston member. Also, air or gas may escape from the piston member via fissures, cracks, poor weldings or via poor flange couplings as well as air may enter the piston member at such places. In any of the situations the air or gas will either result in that the oil pressure in the detecting zone increases or decreases and immediately reveals that a leak has occurred. Thus any indication that the pressure deviates from a fixed standard pressure or pressure interval is an indication of the presence of a leak.

If the pressure measuring instrument is in fluid communication with the pressurized chamber via a pipe, the pressurized chamber, that constitutes a linear seal, may be filled with a pressurized oil at an oil pressure that is higher than the pressure at the recipient. The spaced apart annular seal members may be are arranged on opposite sides of said pipe to provide a reliable pressurized chamber with extended lifetime. Opposite the sealing ring or seat the piston can be consistently oiled. Leakage in any part of the reciprocating system is detected immediately because gaseous matter will either be forced or by itself escape into the pressurized chamber via the oil pipe to the pressure measuring instrument if the pressure in the reciprocating system drops below a desired level, such as the pressure at the recipient. The pressure measuring instrument may trigger an alarm or other indication that the pressure has dropped to an undesired level and that measures need to be taken to remedy the reason for the leakage.

Preferably the annular seal means member is a lip seal or one or more O-rings arranged in recesses in the interior annular wall of the cylinder barrel chamber. The lip seal has a flexible lip that rubs against the reciprocating piston to prevent the leakage of oil and ingress of dirt to the pressurized chamber. Once a leak is present the sealing capacity is inadequate which can have several different effects on the piston member, including affecting the travel speed of the piston. The oil pressure in the pressurized chamber attempt to equalize the pressure difference which action is registered by the pressure measuring instrument. Numerous types of exclusionary lips may be used within the scope of the present invention.

At least one circumferential slide seals may be arranged in the cylinder barrel chamber wall interposed between a pipe inlet to the pressurized chamber and the annular seal member for facilitating a smooth reciprocating movement of the piston inside the cylinder barrel and may in a preferred embodiment be a Teflon® seal.

The sealing ring or seat may be dimensioned to extend radially inside the distal cylinder barrel chamber at a distance of between 2‰-2% of the interior diameter of the distal cylinder barrel chamber to obtain effective sealing at the distal cylinder barrel end at a transition to an intermediate compartment or other recipient for the material transported by the piston at the end of the piston stroke. This sealing capacity is further ensured if the piston member is dimensioned with a stroke length adapted to deform or contact the sealing ring to seal between the cylinder barrel chamber and the piston.

As mentioned above the invention also relates to an apparatus for continuous transporting apportioned batches of material to a recipient using at least on of the piston members described above. The recipient may for example be a gasifier or reactor combusting solid particulate material at a high pressure, however since the piston member is able just to transport and deliver material to any recipient, the recipient need not be of the kind operating at high pressure and within the scope of the present invention any kind of material can be transported to any kind of recipient in a reliable and secure manner.

An apparatus, which is particular suited for use for continuously transporting apportioned batches of material to a recipient working at high process pressure, may comprise at least three piston members of the previously described kind. Such an apparatus advantageously serves as a sluice system where apportioned batches of material are delivered as individual portions to the recipient in a system where any fluid communication between the raw material and the recipient has been removed and excluded and where bridging cannot take place.

A preferred embodiment of such an apparatus may advantageously be configured so that a first piston member may receive the material to be transported, the first piston member has a first piston reciprocating inside a cylinder barrel, the first piston divides the first cylinder barrel chamber of the first cylinder barrel into a first proximal cylinder barrel chamber having a first capped end and a first distal cylinder barrel chamber having an opposite first distal cylinder barrel end, a second piston member may have a second piston reciprocating inside a second cylinder barrel, the second piston divides the second cylinder barrel chamber of the second cylinder barrel into a second proximal cylinder barrel chamber having a second capped end and a second distal cylinder barrel chamber having an opposite second distal cylinder barrel end, a third piston member may have a third piston reciprocating inside a third cylinder barrel, the third piston divides the third cylinder barrel chamber of the third cylinder barrel into a third proximal cylinder barrel chamber having a third capped end and a third distal cylinder barrel chamber having an opposite third distal cylinder barrel end, wherein the first piston member may, in its first forward piston stroke, transport material fed to the first distal cylinder barrel chamber, into a first intermediate compartment or sluice defined by at least the second distal cylinder barrel chamber and the third piston positioned at its third distal end, and the second piston member may, in its second forward piston stroke, transport material from the first intermediate compartment or sluice to a second compartment defined by the third distal cylinder barrel chamber, the distal end of the second piston and the recipient.

By means of such an apparatus it is possible to transport solid material to for example a gasifier or reactor without compressing the material and just pushing the material forward by means of the pistons of the piston members in alternating piston strokes. Due to the confined intermediate compartments or sluices defined by the controlled reciprocating movements of the sequentially working pistons inside their respective cylinder barrel chambers there is no direct communication between the raw material feeder and the recipient. Bridging can never occur and the apparatus is safer than known screw feeder systems, has a higher operating capacity and is easy to maintain in good working order. Operating trouble, such as operational failure or stoppage, is rare but if occurring fast and easy to remedy by an often very simple replacement of a component, such as e.g. a sealing ring subjected to wear. During the entire feeding cycle a superior mechanical seal against the process pressure in the recipient can be established and maintained.

The material is just pushed through the temporary intermediate compartments, one compartment after the other, in the operating cycle given by the reciprocating pistons in there respective cylinder barrel, which have been arranged in communication with each other enabling the first piston of the first piston member to deliver material to the second cylinder barrel chamber of the second cylinder, and once this has taken place enabling the second piston to deliver the apportioned batch of material into the third cylinder barrel chamber of the third piston member, the third piston of which eventually pushes the apportioned batch of material into the recipient. During an operating cycle step the next apportioned batch of material may already be progressing in the cycle making the intermediate compartments filled repeatedly. Thus the operating cycle is continuously repeated over and over again. The piston members move material forward without compressing the material and the particle size distribution (PSD) is substantially undisturbed.

The at least one sealing ring or seat, preferably manufactured of a ductile metal, contributes in providing sealing of the intermediate compartments defining the sluice system for delivering the material to the final recipient. The initial texture and particle size distribution is maintained during the entire transport.

Only one piston member is required for continuous delivering apportioned batches of material to a recipient in an operating cycle comprising the steps of
- retracting the piston to the proximal end to enlarge the distal cylinder barrel chamber,
- supplying the material to the distal cylinder barrel chamber, and
- performing a piston stroke toward the distal end of the cylinder barrel to deliver the apportioned batch of material to a recipient.

This simple method may be preferred if material is to be delivered to a recipient which is not pressurized.

A preferred method according to the present invention involving more than one piston member comprises to continuously feed apportioned batches of raw material to the first piston member of the apparatus, and operating the apparatus to transport the batches of raw material to a recipient by reciprocating the first piston of the first piston member, the second piston of the second piston member and the third piston of the third piston member in a repeated feeder cycle where the pistons are positioned to define intermediate compartments for sequences of batches of material fed to the first piston member's first distal cylinder barrel chamber.

The preferred method according to the present invention may comprise the further steps of
- (a) arranging the first piston at the proximal end of the first cylinder barrel,
- (b) arranging the second piston at the distal end of the second cylinder barrel, and arranging the third piston at the distal end of the third cylinder barrel,
- (c) supplying an apportioned batch of raw material to be delivered to a recipient under high pressure to the first distal cylinder barrel chamber while returning the second piston to the proximal end of the second cylinder barrel,
- (d) moving the first piston towards the distal end of the first cylinder barrel to feed the raw material into a first intermediate compartment in front of the second piston of the second piston member, and by means of the first piston and the first sealing ring or seat provide a first seal between the first cylinder barrel and the second cylinder barrel,
- (e) moving the third piston to the proximal end of the third cylinder barrel maintaining the first seal between the first cylinder barrel and the second cylinder barrel,
- (f) moving the second piston towards the distal end of the second cylinder barrel to provide a second seal between the second cylinder barrel and the third cylinder barrel chamber by means of the second sealing ring or seat and the second piston which feeds raw material into a second intermediate compartment in front of the third piston of the third piston member,
- (g) maintaining the second seal while returning the first piston to the proximal end of the first cylinder barrel while the third piston simultaneously is moved to the distal end of the third cylinder barrel to deliver the raw material to the recipient, and
- (h) repeating steps b-g.

In a modified method according to the present invention all piston members are open when repeating the operating cycle.

Thus in the modified embodiment the method may comprise the operating cycle steps of
- (a') arranging the first piston at the proximal end of the first cylinder barrel, arranging the second piston at the proximal end of the second cylinder barrel, and arranging the third piston at the proximal end of the third cylinder barrel,
- (b') arranging the first piston at the distal end of the first cylinder barrel, arranging the second piston at the distal end of the second cylinder barrel, and arranging the third piston at the distal end of the third cylinder barrel,
- (c') arranging the second piston at the proximal end of the second cylinder barrel, and arranging the first piston at the proximal end of the first cylinder barrel,
- (d') supplying an apportioned batch of raw material to be delivered to a recipient under high pressure to the first distal cylinder barrel chamber and moving the first piston towards the distal end of the first cylinder barrel to feed the batch of raw material into the first compartment,
- (e') retracting the third piston towards the proximal end of the third cylinder barrel,
- (f') moving the second piston towards the distal end of the second cylinder barrel to feed the batch of raw material into the second compartment,
- (g') moving the third piston towards the proximal end of the third cylinder barrel,
- (f') repeating steps c'-g'.

In any of the above embodiments of piston members, apparatuses' or methods the at least one piston member may be hydraulic or pneumatic.

BRIEF DESCRIPTION OF THE DRAWINGS

The invention will now be described by way of example illustrating an apparatus with three piston members. It should be understood that more than three piston members may be implemented in the apparatus according to the present invention if considered appropriate.

FIG. 7 shows the same, but with the piston in another operating step.

DETAILED DESCRIPTION OF THE INVENTION

Figure 1:
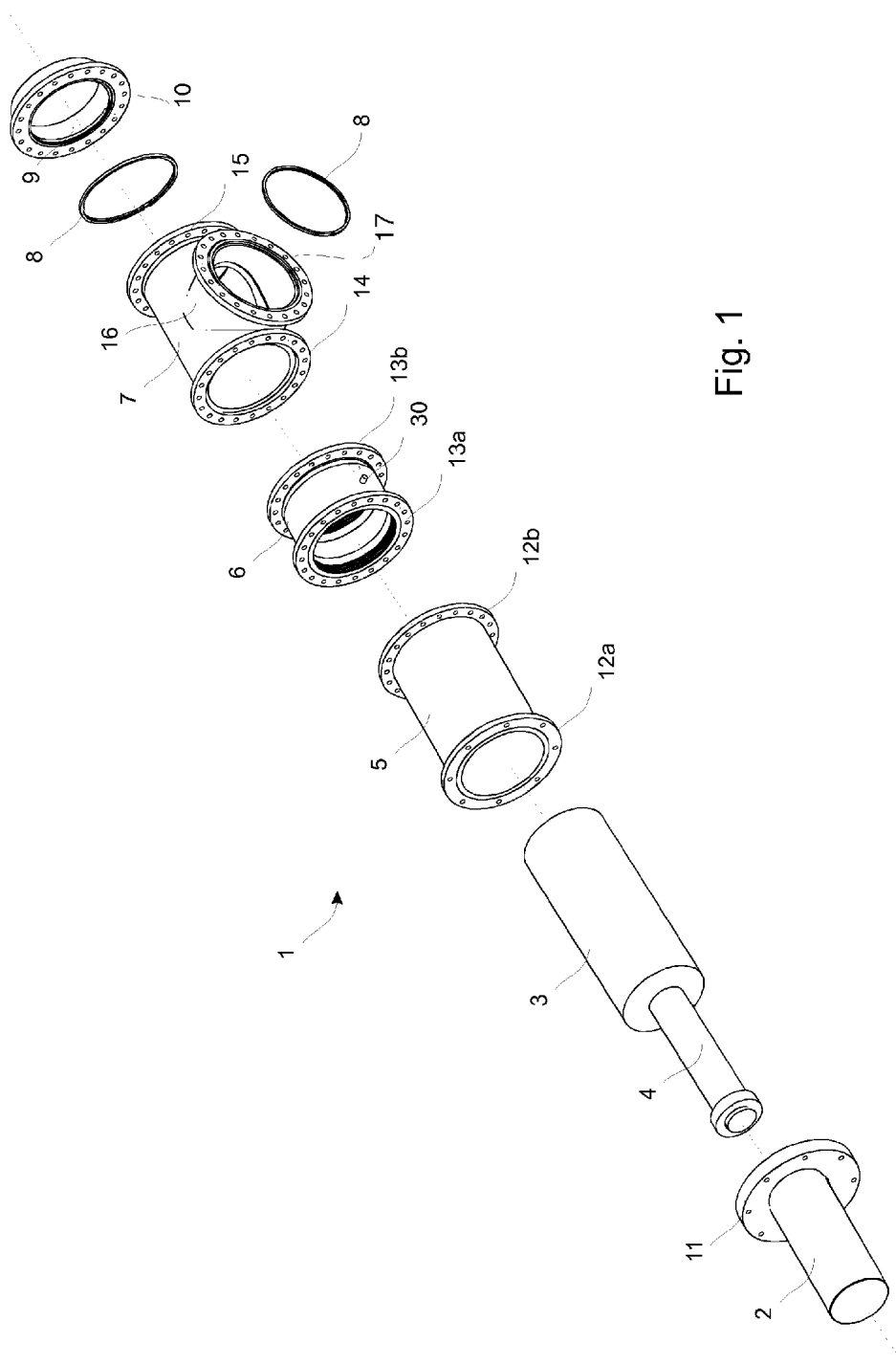
FIG. 1 shows a perspective exploded view of a first embodiment of a piston member according to the present invention without a nose.

FIG. 1 shows in an exploded view the components of a first embodiment of a piston member 1 according to the present invention adapted for delivering material to a recipient (not shown).

The piston member 1 consist of a proximal end cap 2, a piston 3 with a piston rod 4, a piston barrel 5, a tubular pressurized chamber cylinder 6, a T-shaped coupling cylinder section 7, a sealing ring 8 and an exit pipe 9 with a flange 10. The total cylinder barrel available for the piston's travel consist of the piston cylinder barrel 5, the tubular pressurized chamber cylinder 6, and the T-shaped coupling cylinder section 7, the latter of which forms the distal end of the total cylinder barrel.

The proximal end cap 2 has a first coupling flange 11 for coupling with a corresponding first coupling flange 12a on the piston cylinder barrel 5. The piston cylinder barrel 5 has a second coupling flange 12b opposite the first coupling flange 12a for coupling with a corresponding first flange 13a on the pressurized chamber cylinder 6. Opposite the first coupling flange 13a the pressurized chamber has a second coupling flange 13b adapted for coupling together with a corresponding first flange 14 on the tubular T-shaped coupling cylinder section 7. Axially opposite the first flange 14 said tubular T-shaped coupling cylinder section 7 has as second flange 15 for coupling, in the case shown, to the flange 10 of the exit pipe 9. However the second flange 15 could also be provided for coupling to another coupling piece on another piston member as will be described later. Perpendicular to the axis of the tubular T-shaped coupling cylinder section 7, said tubular T-shaped coupling cylinder section 7 has a coupling piece 16 with a third coupling flange 17 for coupling to e.g. a screw feeder, another piston member or other material supply system.

The piston member according to the present inventions consist of components that can be assembled to or used in a piston feeder for feeding raw material to a recipient. Each individual component has an acceptable effective life but is easy to replace as well. Since the piston member is composed of easy replaceable individual smaller unit components downtime can be kept at a minimum.

The structure, composition, arrangement and function of the individual components of the piston member as well as of the piston member in co-operation with additional piston members will be described in further details with reference to the additional figures to further clarify to the person skilled in the art how the apparatus and method according to the present invention operates.

Figure 2:
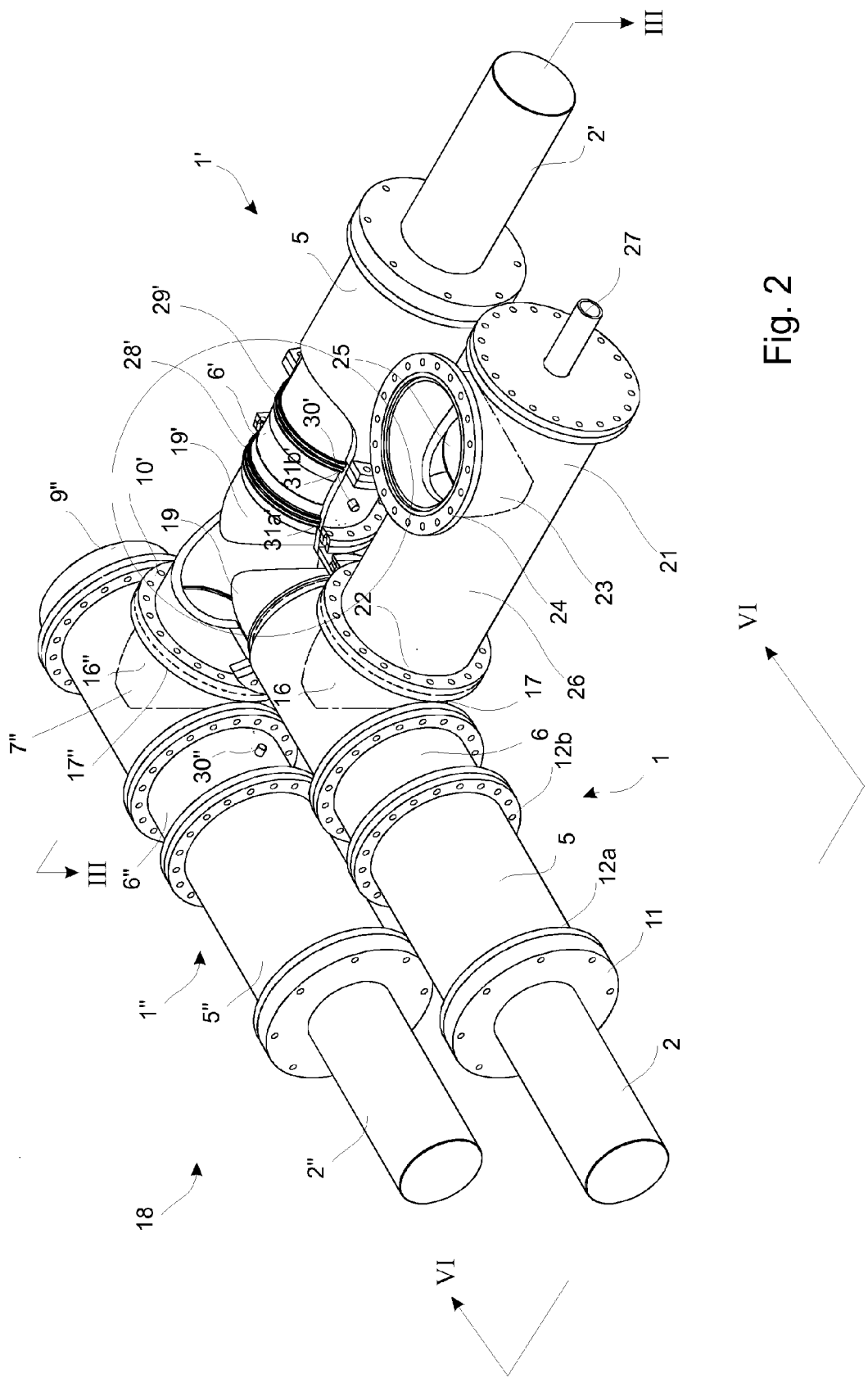
FIG. 2 shows, in perspective, an apparatus with three piston members according to the present invention and a screw feeder, where a part of the exterior wall of the apparatus has been removed for illustrative purposes to reveal the interior structure of the apparatus.

FIG. 2 shows a perspective view of an apparatus 18 according to the present invention with three co-operating piston members 1, 1', and 1". The piston member 1", seen to the upper left in FIG. 2, constitutes the third piston member of the apparatus 18, and is the last in a sequential series of substantially identical piston members 1, 1', 1" for transporting the raw material supplied by screw feeder 21 into a high pressure recipient (not shown) such as a gasifier where e.g. coal powder is converted to a gaseous fuel. The piston members 1, 1', 1" correspond substantially to the piston member seen in FIG. 1 and for like parts same reference numerals with the exception that the components of the first piston member 1 is indicated without apostrophe, the components of the second piston member 1' is indicated with one apostrophe, and the components of the third piston member 1" is indicated with two apostrophes.

The screw feeder 21 is coupled to the third coupling flange 17 of the first coupling piece 16 of the first piston member 1 by means of a distal coupling flange 22. The screw feeder 21 consists of a screw feeder coupling piece 23 with a screw feeder coupling piece flange 24 for coupling to a raw material reservoir (not shown). The screw feeder coupling piece 23 is arranged to feed raw material to the screw 25, which is rotatable arranged inside a feed tube 26 by means of shaft 27.

The first and the second piston member 1, 1' differ from the piston member seen in FIG. 1 in that the piston 3,3' is provided with a front noses 19,19', as can be seen in the encircled cut out section at the upper right in FIG. 2. The cut out section reveals the interior structure of the pressurized chamber 6' of the second piston member 1', where first and second annular lip seal members 28',29' are arranged in axial distance on opposite sides of an oil inlet pipe 30' for supplying a pressurized oil to the clearance between the interior annular wall of the pressurized chamber and the piston 3'. The first and second annular seal members 28',29' are accommodated in suitable recesses 30',31' made in the interior wall of the pressurized chamber 6'. The pressurized chamber could in the alternative be shifted upstream or downstream along a cylinder barrel.

Figure 3:
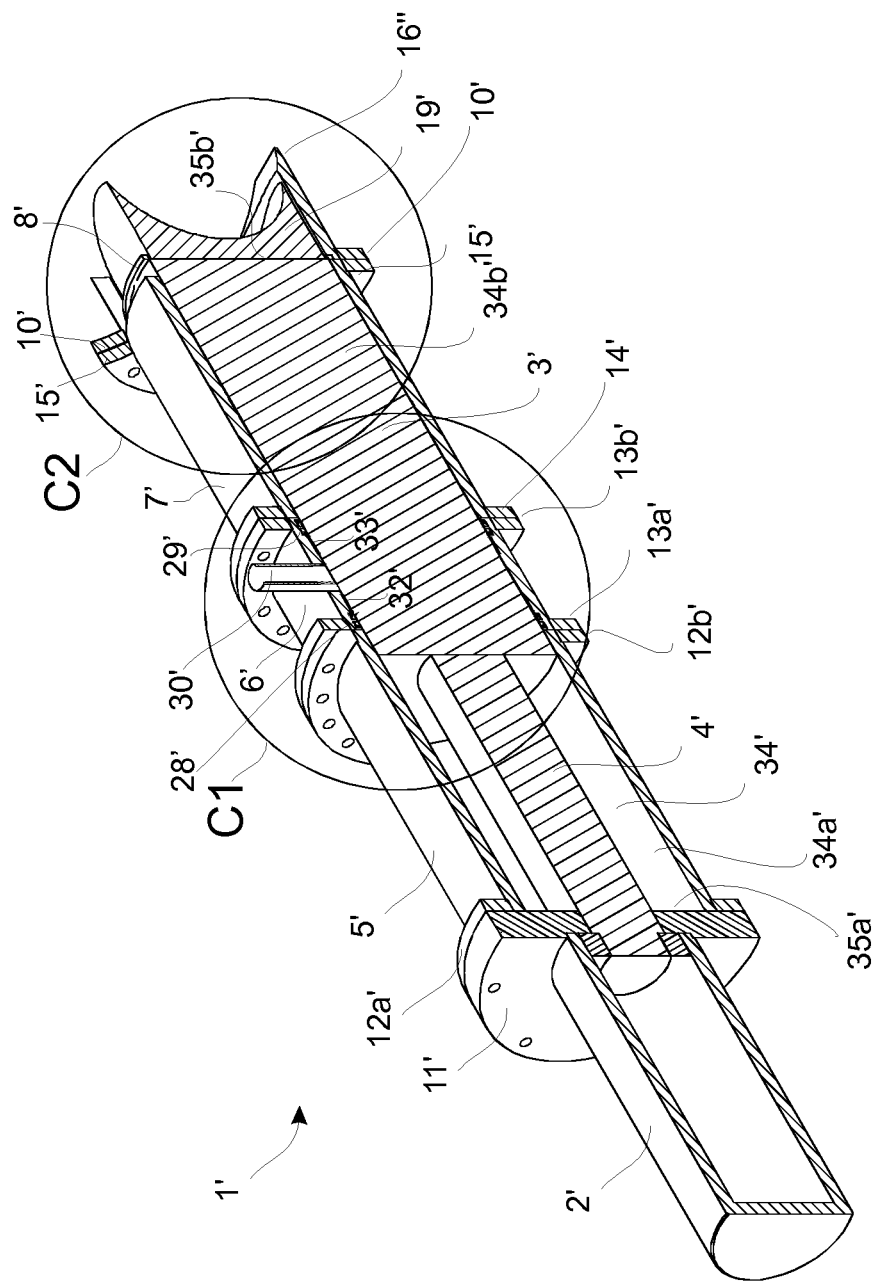
FIG. 3 shows a section taken along line III-III of the second piston shown in FIG. 2.

FIG. 3 shows a section taken along line III of the second piston shown in FIG. 2. The proximal end of the piston 3 has a nose 19' configured as a concave solid body for compensating for difference in volume of piston and volume of the intermediate compartment created in front of the nose in a cylinder barrel, as will be described later with references to FIGS. 6 and 7.

Figure 4:
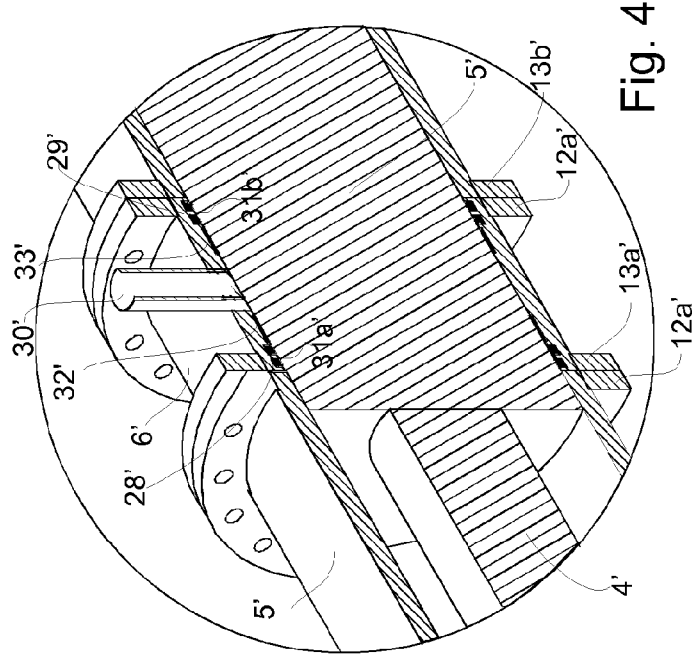
FIG. 4 is an enlarged scale view of the encircled area C1 of FIG. 3.

As seen more clearly in FIG. 4, which is an enlarged scale view of the encircled area C1 of FIG. 3, the first and second annular lip seal members 28',29' and the second piston member 1' are arranged in axial distance on opposite sides of the oil inlet pipe 30' in recesses 31a',31b' in the interior wall of the pressurized chamber 6'. Slide seals 32',33' are interposed between the annular lip seal member 28',29' and the oil pipe inlet 30'. The entire linear seal of the pressurized chamber 6' serves expediently for both oiling the reciprocating piston 3' and as a means for detecting leakage of gas in the reciprocating apparatus. The first piston member 1 are in a similar manner configured with an annular lip seal member 28,29, oil inlet pipe 30 in recesses 31a,31b in the interior wall of the pressurized chamber 6 as well as slide seals 32,33. Also the third piston member 1 are configured with an annular lip seal member 28",29", oil inlet pipe 30" in recesses 31a",31b" in the interior wall of the pressurized chamber 6" as well as slide seals 32",33".

Figure 5:
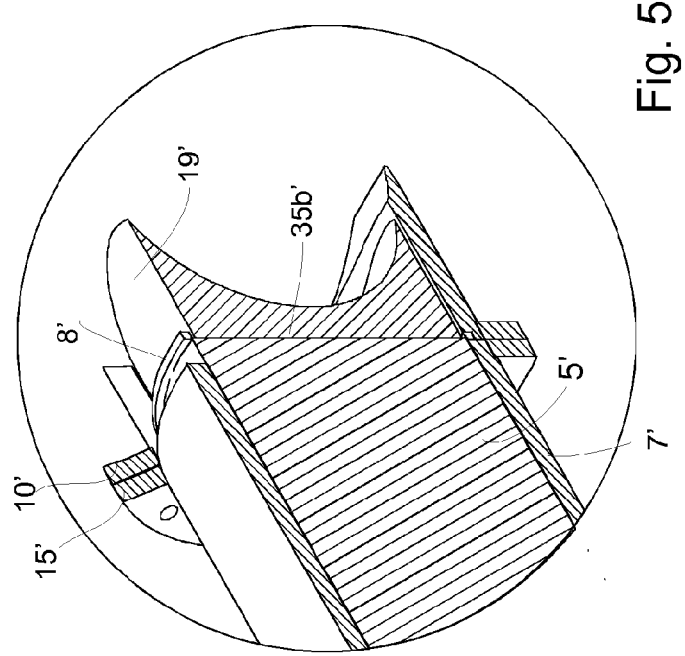
FIG. 5 is an enlarged scale view of the encircled area C2 of FIG. 3.

FIG. 5 is an enlarged scale view of the encircled area C2 of FIG. 3 and shows the sealing ring 8', which sealing ring 8' is arranged at the distal end 35b' of the cylinder barrel 5',6',7' for engaging the piston 3' to create a firm fluid tight sealing barrier between the third piston member 1" and the second piston member 1' while the third piston 3' moves the apportioned raw material initially delivered by the first piston member 1 towards the recipient via the exit pipe 9.

Figure 6:
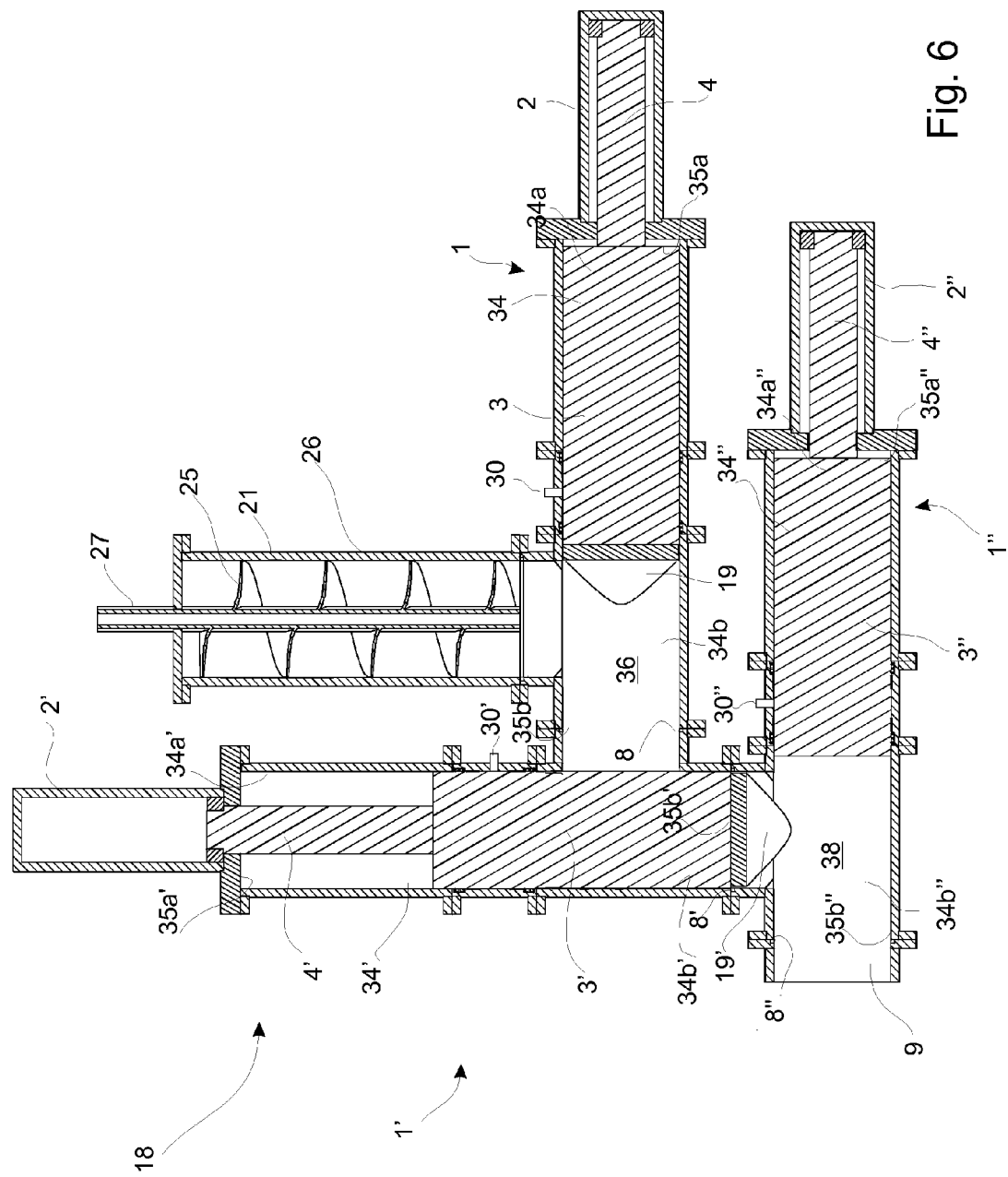
FIG. 6 shows a sectional view taken along line VI-VI in FIG. 2 illustrating the pistons of the piston members in an operating step of an operation cycle of the apparatus according to the present invention.

FIGS. 6 and 7 illustrate the operating principle of the apparatus 18 shown in FIG. 2 and the method of using the apparatus 18.

The first piston 3 divides the first cylinder barrel chamber 34 in a first proximal cylinder barrel chamber 34a and a first distal cylinder barrel chamber 34b, the second piston 3' divides the second cylinder barrel chamber 34' in a second proximal cylinder barrel chamber 34a' and a second distal cylinder barrel chamber 34b', and the third piston 3" divides the third cylinder barrel chamber 34" in a third proximal cylinder barrel chamber 34a" and a third distal cylinder barrel chamber 34b".

In the operating cycle of the apparatus 18 the first piston 3 starts positioned in the first proximal cylinder barrel chamber 34a at the proximal end 35a of the first cylinder barrel 5,6,7 exposing the first distal cylinder barrel chamber 34b for receiving a batch of raw material from the screw feeder 21. The second piston 3' is positioned in the second distal cylinder barrel chamber 34b' of the second cylinder barrel 5',6',7' with the nose 19' slightly protruding into the third cylinder barrel chamber 34". The second piston 3' is arranged substantially perpendicular to both the first piston 3 and the third piston 3" and provides, together with the sealing rings 8,8',8" seal towards the first piston member 3 and the third piston 3". A feed compartment 36 is delimited by the first distal cylinder barrel chamber 34b, the first sealing ring 8, the second piston 3' and the screw feeder 21.

Once the batch of the raw material has been transferred to the receiving compartment 36, the first piston 3 with the nose 19 moves forward towards the second piston 3' until it hits the sealing ring 8 to deliver the apportioned batch of raw material into a first compartment 37.

As seen in FIG. 7 the third piston 3" moves into the third distal cylinder barrel chamber 34a" while maintaining the seal between the first cylinder barrel 3 and the second cylinder barrel 3'. Then the second piston 3' of the second piston member 1', which initially blocks for access of material's to the second cylinder barrel chamber 34', returns to the proximal end 35a' of the second cylinder barrel chamber 34' enabling the batch of raw material from the first intermediate compartment 36 to proceed into the second distal cylinder barrel chamber 34b' in front of the nose 19' of the second piston 3'. The second distal cylinder barrel chamber 34b' delimits together with the nose 19 of the first piston 3 and the third piston 3" a fluid tight second intermediate chamber 38.

In the next step of the operating cycle the second piston 3' is moved into the second distal cylinder barrel chamber 34b' of the second cylinder barrel 34'. At the end of the second piston 3''s piston stroke a seal between the second cylinder barrel chamber 34' and the third cylinder barrel chamber 34" is established by means of the second sealing ring 8', the second piston 3' and the third piston 3" while the seal at the same time is regenerated, to allow for the first piston 3 to return to the proximal end 35a of the first cylinder barrel chamber 34 in a safe manner. At the same time the third piston 3" simultaneously is moved to the distal end 35b" of the third cylinder barrel chamber 34" to deliver the raw material to the recipient. The feeder cycle is repeated as long as required.

EXAMPLE

A Pilot Feeding Apparatus with Ductile Sealing Ring

A feeding apparatus that is designed to feed coal powder having a bulk density of 650 kg pr m$^3$ and a particle density 1300 kg/m$^3$ against a reactor pressure of 60 bar with no gas flowing in or out of the process. A first piston member is feed axially by gravity by means of a continuous screw feeder. The first piston member co-operates with a second piston member and a third piston member all having a cylinder barrel of diameter 700 mm and a stroke length of 1000 mm.

The piston speed of the second piston member and the third piston member is 250 mm/sec. during forward transport of material and 350 mm/sec. during returning and retracting the second piston and the third piston, respectively, whereas the speed of the first piston member is 350 mm/sec during forward movement and 400 mm/sec. during returning and retracting. At the end of the forward movement of the piston members the pistons hit and deform the ductile sealing rings and compresses the material to a degree sufficient to obtain a sealing capacity that prevents leakage. A piston stays in its distal forward position about 0.5 second to ensure detection of an effective sealing, resulting in a piston stroke cycle time of about 15-20 seconds.

The capacity of the apparatus is 0.384 m$^3$ per stroke or 0.024 m$^3$/sec for a piston stroke cycle time of 16 sec. cycle. With a filling rate of 90% the capacity will be approximately 50 tons of coal powder per hour.

The pistons forces the coal powder into the chamber in front of the next piston and create the seal while overcoming the process pressure and inherent forces of any matter resulting from the transported material.

A forward piston force of between 400-500 N/mm$^2$ is applied to the ductile sealing ring inside the cylinder barrel in the forward piston stroke. The ductile sealing ring is about 2200 mm long and engages the piston at the distal cylinder barrel end. A forward piston force application of approximate 1.1 MN holds against a process pressure that applies 2.7 MN on the 700 mm piston. The force that the sealing ring or seat applies on the piston, the process pressure, and any frictional forces must together be overcomed. A total piston force of about 4 MN for moving the coal powder towards the distal cylinder barrel end of the respective cylinder barrel chamber is more than required.

The piston force required for obtaining a safe and reliable seal to minimize or prevent leakage is the same for each piston, but the work required for the different pistons will be very different.

The first piston must overcome the transport frictional force in both directions and the large sealing force of about 4 MN will only be needed for the last 2-4 mm of the first forward piston stroke when meeting the first ductile sealing ring at the distal end of the first cylinder barrel chamber.

The second piston overcomes the transport frictional force and the process pressure at the forward stroke towards the distal end of the second cylinder barrel chamber and needs the large sealing force of about 4 MN for the last 2-4 mm of the forward stroke when meeting the second ductile sealing ring and to overcome the transport frictional forces on the return stroke towards the proximal end of the second cylinder barrel.

The third piston needs to work against the process pressure on the forward stroke towards the distal end of the third cylinder barrel chamber and the large sealing force of about 4 NM is needed for the last 2-4 mm of the forward stroke. The process pressure in the reactor into which the coal powder is delivered is advantageously utilized in the return stroke of the third piston when the third piston moves towards the proximal end of the third cylinder barrel chamber.

The pistons reciprocate with a tolerance of about 2 mm inside the respective cylinder barrels, which cylinder barrel is terminated by respective end caps to define the desired ratio between the batch of the proximal chamber of the cylinder barrel and the distal cylinder barrel when the piston is reciprocating inside said cylinder barrel chamber.

In the present example coal powder with a bulk density of 650 kg/m$^3$ and a particle density 1300 kg/m$^3$ is fed against 60 bar. A ratio between the two volumes of 36:35 is needed to obtain a neutral flow. If this ratio is smaller there will be a leak flow and if is larger the piston will pump air into the process.

The piston of the piston member advantageously seals towards the cylinder barrel chamber of the next piston member at the end of the piston stroke, which next piston member is arranged in a series of consecutive operating piston members. In case of an apparatus comprising only two piston members a transitional station must be inserted between the two piston members to avoid bridging and effective prevent direct or indirect fluid communication between raw material supply and final recipient. Thus although two piston members can be used within the scope of the present invention apparatuses with three or more piston members is more preferred.

In case of only one piston member, said piston member is used for supplying apportioned batches to a recipient in a single reciprocating operation. Although the sealing capability is less required in this simple embodiment the piston member is usable.

Preferably three consecutive piston members are arranged to operate in a series in an apparatus for transporting coal powder to a gasifier. The movement of the pistons inside the cylinder barrels are controlled in relation to each other to transport apportioned batches of coal powder to a high pressure is gasifier.

What is claimed is:

1. A piston member comprising
   a piston rod provided with a piston reciprocating inside a cylinder barrel having a cylinder barrel chamber, said piston dividing the cylinder barrel chamber into a proximal cylinder barrel chamber having a proximal capped end and a distal cylinder barrel chamber having a distal cylinder barrel end opposite the piston, wherein
   the piston member has an intimate metal-metal seal between components of the piston member and at least one sealing ring or seat that is arranged inside the distal cylinder barrel chamber at the distal cylinder barrel end,
   the sealing ring or seat constitutes an annular protruding end section of reduced diameter of the cylinder barrel chamber, and
   the piston is configured to hit the sealing ring or seat only at an end of a forward piston stroke, and provide a seal between the piston and the sealing ring or seat.

2. The piston member according to claim 1, wherein the at least one sealing ring or seat is manufactured of a ductile material.

3. The piston member according to claim 1, wherein the piston has a front nose facing towards the distal cylinder barrel chamber.

4. The piston member according to claim 3, wherein the nose has an axial cut-out or an axial concavity configured to provide space for another piston reciprocating perpendicular to the piston with the nose.

5. The piston member according to claim 1, wherein the piston member has means for detecting leakage of pressurized gas or fluid from a recipient or through a cylinder barrel chamber in direct or indirect communication with the piston member.

6. The piston member according to claim 5, wherein
   the means for detecting leakage of pressurized gas or fluid comprises a pressure measuring instrument in fluid communication with a pressurized chamber delimited by a circumferential clearance between the piston and an interior wall of the cylinder barrel and two spaced apart annular seal members arranged in or at the interior wall.

7. The piston member according to claim 6, wherein
   the pressure measuring instrument is in fluid communication with the pressurized chamber via a pipe,
   the pressurized chamber holds a pressurized oil at an oil pressure that is higher than the pressure at a recipient and
   the spaced apart annular seal members are arranged on opposite sides of said pipe.

8. The piston member according to claim 7, wherein at least one circumferential slide seal is arranged in the interior wall interposed between a pipe inlet to the pressurized chamber and the annular seal member.

9. The piston member according to claim 6, wherein each of the annular seal members is a lip seal or one or more O-rings.

10. The piston member according to claim 8, wherein the slide seal is a TEFLON® seal.

11. The piston member according to claim 1, wherein the sealing ring or seat is dimensioned to extend radially inside the distal cylinder barrel chamber at a distance of about 2% of an interior diameter of the distal cylinder barrel chamber.

12. The piston member according to claim 1, wherein the piston member is dimensioned with a stroke length adapted to deform or contact the sealing ring to provide a seal between the cylinder barrel chamber and the piston.

13. The piston member according to claim 1, wherein the piston member is hydraulic or pneumatic.

14. An apparatus for continuous transporting apportioned batches of material to a recipient, wherein the apparatus comprises at least one piston member according to claim 1.

15. The apparatus according to claim 14, which comprises at least three piston members.

16. The apparatus according to claim 14, which comprises:
   a first piston member that receives the material to be transported, the first piston member has a first piston reciprocating inside a first cylinder barrel having a first cylinder barrel chamber, with the first piston dividing the first cylinder barrel chamber into a first proximal cylinder barrel chamber having a first capped end and a first distal cylinder barrel chamber having an opposite first distal cylinder barrel end,
   a second piston member that has a second piston reciprocating inside a second cylinder barrel having a second cylinder barrel chamber, with the second piston dividing the second cylinder barrel chamber into a second proximal cylinder barrel chamber having a second capped end and a second distal cylinder barrel chamber having an opposite second distal cylinder barrel end,
   a third piston member that has a third piston reciprocating inside a third cylinder barrel having a third cylinder barrel chamber, with the third piston dividing the third cylinder barrel chamber into a third proximal cylinder barrel chamber having a third capped end and a third distal cylinder barrel chamber having an opposite third distal cylinder barrel end,
   wherein the first piston member transports, in its first forward piston stroke, material fed to the first distal cylinder barrel chamber into a first intermediate compartment or sluice defined by at least the second distal cylinder barrel chamber and the third piston positioned at the third distal end, and
   wherein the second piston member transports, in its second forward piston stroke, material from the first intermediate compartment or sluice to a second intermediate compartment defined by the third distal cylinder barrel chamber, the distal end of the second piston and the recipient.

17. The apparatus according to claim 14, which comprises hydraulic or pneumatic piston members.

18. The apparatus according to claim 14, wherein the recipient is a gasifier or reactor.

19. A method of continuous transporting apportioned batches of material to a recipient by means of the piston member according to claim 1, which comprises an operating cycle of:
   retracting the piston to the proximal end of the cylinder barrel chamber to enlarge the distal cylinder barrel chamber, supplying the apportioned batch material to the distal cylinder barrel chamber, and
   performing a piston stroke toward the distal end of the cylinder barrel chamber to deliver the apportioned batch of material to a recipient.

20. The method of claim 19, which further comprises continuously feeding apportioned batches of raw material to a first piston member of the apparatus, and
operating the apparatus to transport the batches of raw material to a recipient by reciprocating a first piston of the first piston member, a second piston of a second piston member and a third piston of a third piston member in a repeated feeder cycle.

21. A method of continuously transporting raw material to a recipient using an apparatus in accordance with claim 16, the method comprising:
(a) arranging the first piston at a proximal end of the first cylinder barrel,
(b) arranging the second piston at a distal end of the second cylinder barrel and arranging the third piston at a distal end of the third cylinder barrel,
(c) transporting an apportioned batch of raw material to the first distal cylinder barrel chamber while returning the second piston to a proximal end of the second cylinder barrel,
(d) moving the first piston towards a distal end of the first cylinder barrel to feed raw material into the first intermediate compartment in front of the second piston of the second piston member, and by means of the first piston and the first sealing ring or seat provide a first seal between the first cylinder barrel and the second cylinder barrel,
(e) moving the third piston to a proximal end of the third cylinder barrel while maintaining the first seal between the first cylinder barrel and the second cylinder barrel,
(f) moving the second piston towards the distal end of the second cylinder barrel to provide a second seal between the second cylinder barrel and the third cylinder barrel by means of the second sealing ring or seat and the second piston, thereby feeding raw material into the second intermediate compartment in front of the third piston of the third piston member,
(g) maintaining the second seal while returning the first piston to the proximal end of the first cylinder barrel while the third piston simultaneously is moved to the distal end of the third cylinder barrel to deliver the apportioned batch of raw material to the recipient, and
(h) repeating steps c-g.

22. A piston member comprising:
a piston rod provided with a piston configured to reciprocatingly travel between a proximal end and a distal end inside a cylinder barrel having a cylinder barrel chamber, said piston dividing the cylinder barrel chamber into a proximal cylinder barrel chamber having a proximal capped end and a distal cylinder barrel chamber having a distal cylinder barrel end opposite the piston; and
at least one sealing ring or seat arranged inside the distal cylinder barrel chamber at the distal cylinder barrel end, the sealing ring or seat comprising an annular protruding end section of reduced diameter; wherein:
the piston is configured to hit the sealing ring or seat only at an end of a forward piston stroke, and provide a seal between the piston and the sealing ring or seat.

23. The piston member according to claim 22, wherein the at least one sealing ring or seat is manufactured of a ductile material.

24. The piston member according to claim 22, wherein:
the at least one sealing ring or seat is manufactured of a ductile metal; and
the seal provided by the piston hitting the at least one sealing ring or seat is a metal-to-metal seal.

25. The piston member according to claim 22, wherein:
the piston has a front nose facing towards the distal cylinder barrel chamber; and
the nose has an axial cut-out or an axial concavity configured to provide space for another piston reciprocating perpendicular to the piston with the nose.

26. The piston member according to claim 22, further comprising:
a pipe inlet to the cylinder barrel, the pipe inlet being in fluid communication with a pressurized chamber delimited by a circumferential clearance between the piston and an interior wall of the cylinder barrel and two spaced apart annular seal members arranged in or at the interior wall, one annular seal member on either side of the pipe inlet; and
at least one circumferential slide seal arranged in the interior wall and interposed between the pipe inlet and each of the annular seal members.

27. The piston member according to claim 26, further comprising:
a pressure measuring instrument for detecting leakage of pressurized gas or fluid from the pressurized chamber, the pressure measuring instrument being in fluid communication with the pressurized chamber via a pipe connected to the pipe inlet.

28. An apparatus for continuously transporting a carbonaceous material to a pressurized gasifier or reactor, comprising:
a first piston member comprising a first piston rod provided with a first piston configured to reciprocatingly travel inside a first cylinder barrel having a first cylinder barrel chamber, and a first sealing ring or seat comprising an annular protruding end section of reduced diameter of the first cylinder barrel chamber, the first piston configured to hit the first sealing ring or seat only at an end of a first forward piston stroke, and provide a first seal with the first sealing ring or seat;
a second piston member comprising a second piston rod provided with a second piston configured to reciprocatingly travel inside a second cylinder barrel having a second cylinder barrel chamber, and a second sealing ring or seat comprising an annular protruding end section of reduced diameter of the second cylinder barrel chamber, the second piston configured to hit the second sealing ring or seat only at an end of a second forward piston stroke, and provide a second seal with the second sealing ring or seat;
a third piston member comprising a third piston rod provided with a third piston configured to reciprocatingly travel inside a third cylinder barrel having a third cylinder barrel chamber, and a third sealing ring or seat comprising an annular protruding end section of reduced diameter of the third cylinder barrel chamber, the third piston configured to hit the third sealing ring or seat only at an end of a third forward piston stroke, and provide a third seal with the third sealing ring or seat; and
a feeder configured to transport carbonaceous material to the first cylinder barrel chamber; wherein:
a distal end of the first cylinder barrel chamber communicates with the second cylinder barrel chamber at a point before the second sealing ring or seat;
a distal end of the second cylinder barrel chamber communicates with the third barrel chamber at a point before the third sealing ring or seat; and
a distal end of the third cylinder barrel chamber is configured to communicate with a gasifier or reactor.

29. The apparatus according to claim 28, wherein the first, second and third sealing ring or seat are manufactured of a ductile material.

30. The apparatus according to claim 28, further comprising:
first, second and third pressure measuring instruments configured to detect leakage of pressurized gas or fluid in a pressurized chamber of a corresponding first, second or third cylinder barrel; wherein:
each pressure measuring instrument is in fluid communication with a corresponding pressurized chamber via a pipe connected to a pipe inlet; and
each pressurized chamber is delimited by a circumferential clearance between the corresponding piston and an interior wall of the corresponding cylinder barrel and two spaced apart annular seal members arranged in or at the interior wall, one annular seal member on either side of the pipe inlet.

31. The apparatus according to claim 30, further comprising:
at least one circumferential slide seal arranged in each cylinder barrel interior wall and interposed between the pipe inlet and each of the annular seal members.

32. A method for continuously transporting carbonaceous material to a pressurized gasifier or reactor, the method comprising:
(a) providing an apparatus in accordance with claim 28;
(b) supplying an apportioned batch of carbonaceous material to the first cylinder barrel chamber with the third seal provided and the first seal not provided;
(c) moving the first piston towards a distal end of the first cylinder barrel to provide the first seal and feed the apportioned batch of carbonaceous material into the second cylinder barrel chamber in front of the second piston, while maintaining the third seal;
(d) moving the third piston to remove the third seal while maintaining the first seal;
(e) moving the second piston towards a distal end of the second cylinder barrel to form the second seal and feed the apportioned batch of carbonaceous material into the third cylinder in front of the third piston;
(f) moving the third piston towards a distal end of the third cylinder barrel to form the third seal and feed the apportioned batch of carbonaceous material to the gasifier or reactor; and
(g) repeating steps b-f.

33. The method according to claim 32, wherein:
in step (b), the second seal is also provided;
in step (c), the second piston is moved to remove the second seal; and
in step (f), the first piston is moved to remove the first seal.

34. An apparatus for continuously transporting coal powder to a pressurized gasifier or reactor, the apparatus comprising:
a plurality of serially connected piston members including a first piston member and a last piston member, each piston member configured to feed coal powder to a subsequent piston member with the last piston member configured to supply coal powder to the gasifier or reactor; and
a feeder configured to feed coal powder to the first piston member; wherein:
the plurality of piston members are configured to always provide at least one seal between the feeder and the gasifier or reactor to maintain pressure in the gasifier or reactor, as the coal powder is fed from any of the piston members towards the gasifier or reactor.

35. A method for continuously transporting coal powder to a pressurized gasifier or reactor, the coal powder being supplied via serially connected first, second and third piston members having respective first, second and third cylinder barrel chambers configured to selectively provide a first seal between the first and second cylinder barrel chambers, selectively provide a second seal between the second and third cylinder barrel chambers, and selectively provide a third seal between the third cylinder barrel chamber and the gasifier or reactor, the method comprising:
(a) supplying an apportioned batch of coal powder to a first cylinder barrel chamber with the second and third seals provided and the first seal not provided;
(b) feeding the apportioned batch of coal powder from the first cylinder barrel chamber to the second cylinder barrel chamber while the third seal is provided and the second seal is not provided;
(c) feeding the apportioned batch of coal powder from the second cylinder barrel chamber to the third cylinder barrel chamber while the first seal is provided and the third seal is not provided;
(d) feeding the apportioned batch of coal powder from the third cylinder barrel chamber to the gasifier while the second seal is provided; and
(e) repeating steps a-d, while detecting for leakage in the first, second and third cylinder barrel chambers.

\* \* \* \* \*